United States Patent
Crum et al.

(10) Patent No.: US 10,851,786 B2
(45) Date of Patent: Dec. 1, 2020

(54) ROTARY SCREW COMPRESSOR WITH ATOMIZED OIL INJECTION

(71) Applicant: Ingersoll-Rand Company, Davidson, NC (US)

(72) Inventors: Daniel R. Crum, Huntersville, NC (US); Ryan Patrick Coleman, Huntsville, NC (US)

(73) Assignee: Ingersoll-Rand Industrial U.S., Inc., Davidson, NC (US)

( * ) Notice: Subject to any disclaimer, the term of this patent is extended or adjusted under 35 U.S.C. 154(b) by 309 days.

(21) Appl. No.: 15/717,596

(22) Filed: Sep. 27, 2017

(65) Prior Publication Data
US 2019/0093659 A1   Mar. 28, 2019

(51) Int. Cl.
| | |
|---|---|
| F04C 29/00 | (2006.01) |
| F04C 18/16 | (2006.01) |
| F04C 29/02 | (2006.01) |
| F16N 7/34 | (2006.01) |

(52) U.S. Cl.
CPC ............ *F04C 29/028* (2013.01); *F04C 18/16* (2013.01); *F04C 29/0007* (2013.01); *F04C 29/02* (2013.01); *F16N 7/34* (2013.01); *F04C 2240/20* (2013.01); *F04C 2240/30* (2013.01)

(58) Field of Classification Search
CPC .... F04C 29/028; F04C 18/16; F04C 29/0007; F04C 29/02; F04C 29/0014; F04C 29/042; F16N 7/34
See application file for complete search history.

(56) References Cited

U.S. PATENT DOCUMENTS

| | | | |
|---|---|---|---|
| 1,239,168 A | 9/1917 | Eneas | |
| 1,282,176 A * | 10/1918 | Binks | B05B 1/3447 |
| | | | 239/488 |
| 1,496,924 A | 6/1924 | Day | |
| 2,264,914 A | 12/1941 | L'Orange | |
| 3,175,643 A | 3/1965 | Davis, Sr. et al. | |
| 3,820,923 A | 6/1974 | Zweifel | |

(Continued)

FOREIGN PATENT DOCUMENTS

| | | |
|---|---|---|
| CN | 103850941 A | 6/2014 |
| DE | 2720214 A1 | 12/1977 |

(Continued)

OTHER PUBLICATIONS

Lechler, "Precision Spray Nozzles and Accessories, Edition 112", undated, pp. 1-20 (hereinafter "Lechler I").

(Continued)

*Primary Examiner* — Deming Wan
(74) *Attorney, Agent, or Firm* — Taft Stettinius & Hollister LLP

(57) ABSTRACT

The present disclosure is directed to a screw compressor system having a compressor housing with a pair of screw rotors rotatably supported within a compression chamber. A lubricant port is in fluid communication with the compression chamber. A nozzle insert having a longitudinal body extending between a first end and a second end can be positioned within the lubricant port. A swirl chamber formed by the nozzle insert or tangential flow into an offset lubricant port is configured to generate an atomized lubricant flow and discharge the atomized lubricant into the compression chamber.

11 Claims, 8 Drawing Sheets

(56) References Cited

U.S. PATENT DOCUMENTS

| | | | |
|---|---|---|---|
| 4,497,185 A | 2/1985 | Shaw | |
| 5,653,565 A | 8/1997 | Fresco | |
| 2005/0271537 A1* | 12/2005 | Firnhaber | F04C 29/122 418/201.2 |
| 2012/0051958 A1 | 3/2012 | Santos et al. | |
| 2013/0001325 A1 | 1/2013 | Schneider | |
| 2013/0209299 A1 | 8/2013 | Santos et al. | |

FOREIGN PATENT DOCUMENTS

| | | |
|---|---|---|
| DE | 1042177 A1 | 7/1992 |
| DE | 4042177 A1 | 7/1992 |

OTHER PUBLICATIONS

Lechler, "Full Cone Nozzles", undated, pp. 3.1-3.16 (hereinafter "Lechler II").
Lechler, "Flat Fan Nozzles", undated, pp. 4.1-4.42 (hereinafter "Lechler III").
European Search Report, European Patent Application No. 18195566.7, dated Feb. 20, 2019, 8 pages.

* cited by examiner

ROTARY SCREW COMPRESSOR WITH ATOMIZED OIL INJECTION

TECHNICAL FIELD

The present application generally relates to industrial air compressor systems and more particularly, but not exclusively, to a compressor system having atomized oil injection.

BACKGROUND

Screw compressor systems are configured to produce a pressurized fluid such as compressed air or the like. Some screw compressors include oil flooded contact cooling lubricant systems. The cooling and lubricating effectiveness of the oil injection systems for oil flooded compressors is vital to the operation of the compressor. Some existing systems have various shortcomings, drawbacks, and disadvantages relative to certain applications. Accordingly, there remains a need for further contributions in this area of technology.

SUMMARY

One embodiment of the present application is a compressor system with an injection nozzle configured to atomize a lubricant. Other embodiments include apparatuses, systems, devices, hardware, methods, and combinations for methods of injecting atomizing lubricant into a compression chamber of a screw compressor. Further embodiments, forms, features, aspects, benefits, and advantages of the present application shall become apparent from the description and figures provided herewith.

DETAILED DESCRIPTION OF THE ILLUSTRATIVE EMBODIMENTS

Figure 1:
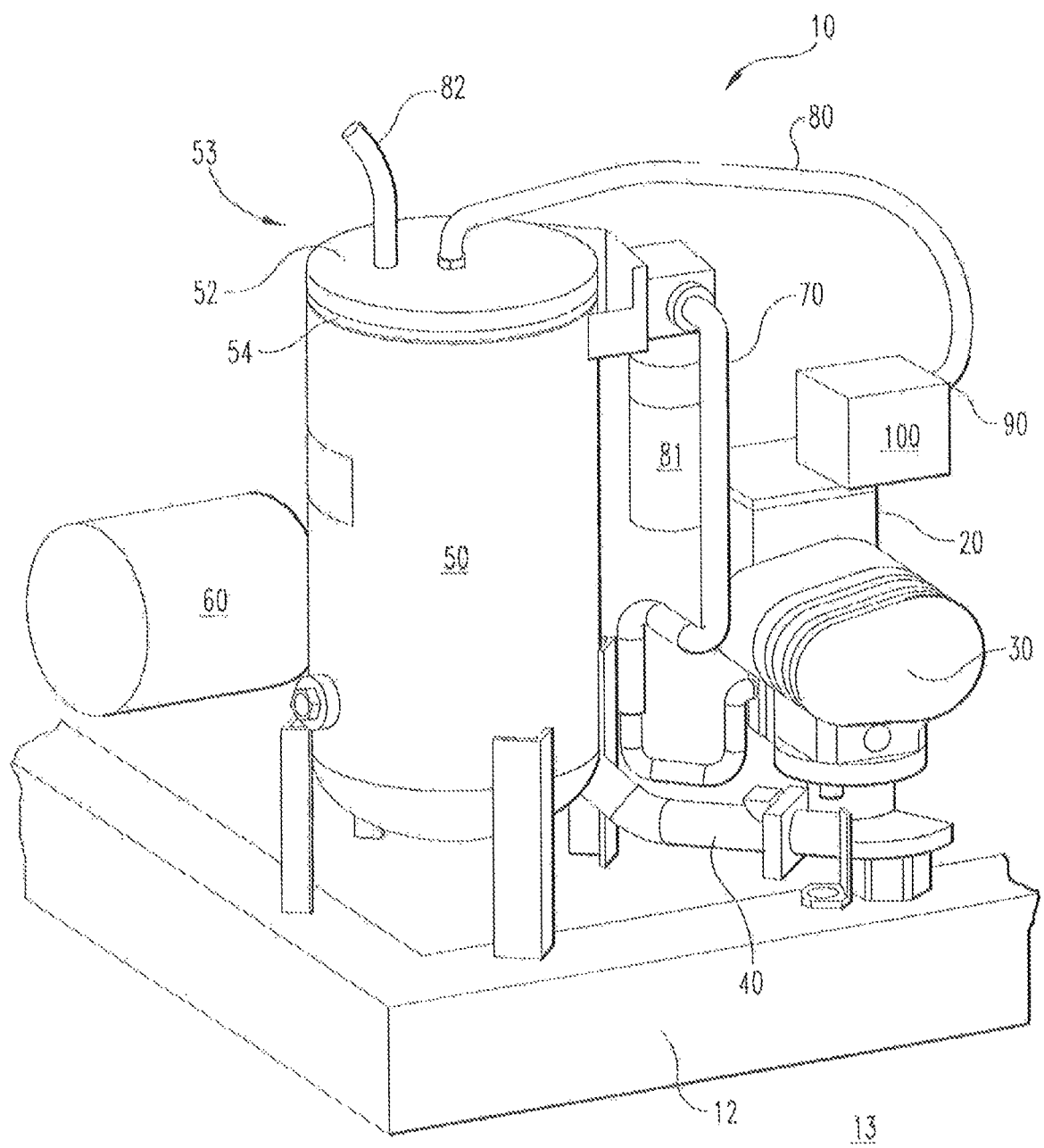
FIG. 1 is a perspective view of a compressor system according to one embodiment of the present disclosure.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

Industrial compressor systems are configured to provide large quantities of compressed fluids at a desired temperature, pressure and mass flow rate. Some compressor systems include fluid-to-fluid heat exchangers to control the temperature of a compressed fluid at various stages within the system. The term "fluid" should be understood to include any gas or liquid medium used in the compressor system as disclosed herein. In one aspect the fluid can include mixtures of air and oil and can be separated into separate constituents in a separating tank. It should be understood that when the term "air" is used in the specification or claims that other working fluids are included under a broad definition of compressible fluids. Also, when the term "oil" or "lubricant" is used in the specification or claims, it should be understood that any lubrication fluid whether carbon based or synthetic in nature is contemplated herein.

Screw compressors can be lubricated, sealed and cooled with lubricant that is injected into a compression chamber having meshed male and female screw rotors. It has been determined that atomization of the lubricant improves the efficiency and performance of screw compressors. Atomizing the lubricant provides a wider flow pattern with greatly reduced lubricant droplet size. The atomized spray pattern increases compression efficiency by reducing leakage of working fluid in the compression chamber as well as increasing heat transfer between the heated working fluid and the lubricant. Contact cooled rotary screw compressors inject lubricant into the compression chambers to lubricate the contacting rotor surfaces, seal the clearance regions between the rotors and cool the working fluid as it is compressed. When a solid stream of lubricant is injected into the compression chamber, the lubricant stream breaks up into course, large droplets upon contact with the rotating screw rotors. The large droplets in the narrow spray pattern are poorly distributed and do not evenly coat critical rotor surfaces. Additionally, the narrow spray pattern has a low surface area per unit volume flow which limits the heat transfer available between the injected lubricant and the heated working fluid within the compression chamber.

By atomizing the lubricant prior to injection into the compression chamber, a finely atomized lubricant stream can be delivered to the compression chamber over a wider spray pattern. The reduced droplet size and improved distribution effectuates a more even lubricant coating on the rotor surfaces and in the clearance regions, thus reducing wear and leakage of working fluid from high pressure to low pressure regions. The smaller droplet size also increases the surface area for a given flow rate which improves the heat transfer during the compression process and improves the overall compression efficiency.

Referring now to FIG. 1, an exemplary compressor system 10 is shown therein. The compressor system 10 includes a primary motive source 20 such as an electric motor, an internal combustion engine or a fluid-driven turbine and the like. The compressor system 10 can include a compressor 30 that may include multi-stage compression. The compressor 30 can include screw rotors operable to compress a working fluid such as air and oil vapor or the like.

A structural base 12 is configured to support at least portions of the compressor system 10 on a support surface 13 such as a floor or ground. Portions of the compressed working fluid discharged from the compressor 30 can be transported through one or more conduits 40 to a sump or separator tank 50 for separating fluid constituents such as air and oil or the like. One or more coolers 60 can be operably coupled with the system 10 for cooling working fluids to a desired temperature in some embodiments. The one or more coolers 60 can cool working fluids such as compressed air or oil to a desired temperature. The compressor system 10 can also include a controller 100 operable for controlling the primary motive power source 20 and various valving and fluid control mechanisms (not shown) between the compressor 30 and intercoolers 60 such as a blow down valve 90.

The separator tank 50 can include a lid 52 positioned proximate a top portion 53 thereof. A seal 54 can be positioned between the lid 52 and separator tank 50 so as to provide a fluid-tight connection between the lid 52 and the separator tank 50. Various mechanical means such as threaded fasteners (not shown) or the like can be utilized to secure the lid 52 to the separator tank 50. A blow down conduit 80 can extend from the separator tank 50 to the blow down valve 90. The blow down valve 90 is operable for reducing pressure in the separator tank 50 when the compressor 30 is unloaded and not supplying compressed air to an end load. An air supply conduit 82 can be operably coupled to the separator tank 50 so as to deliver compressed air to a separate holding tank (not shown) or to an end load for industrial uses as would be known to those skilled in the art. An oil supply conduit 70 can extend from the separator tank 50 to the compressor 30 to supply oil that has been separated from the working fluid in the separator tank 50 to the compressor 30. One or more filters 81 can be used in certain embodiments to filter particles from the oil and/or separate contaminates such as water or the like from working fluids in the compressor system 10.

Figure 2:
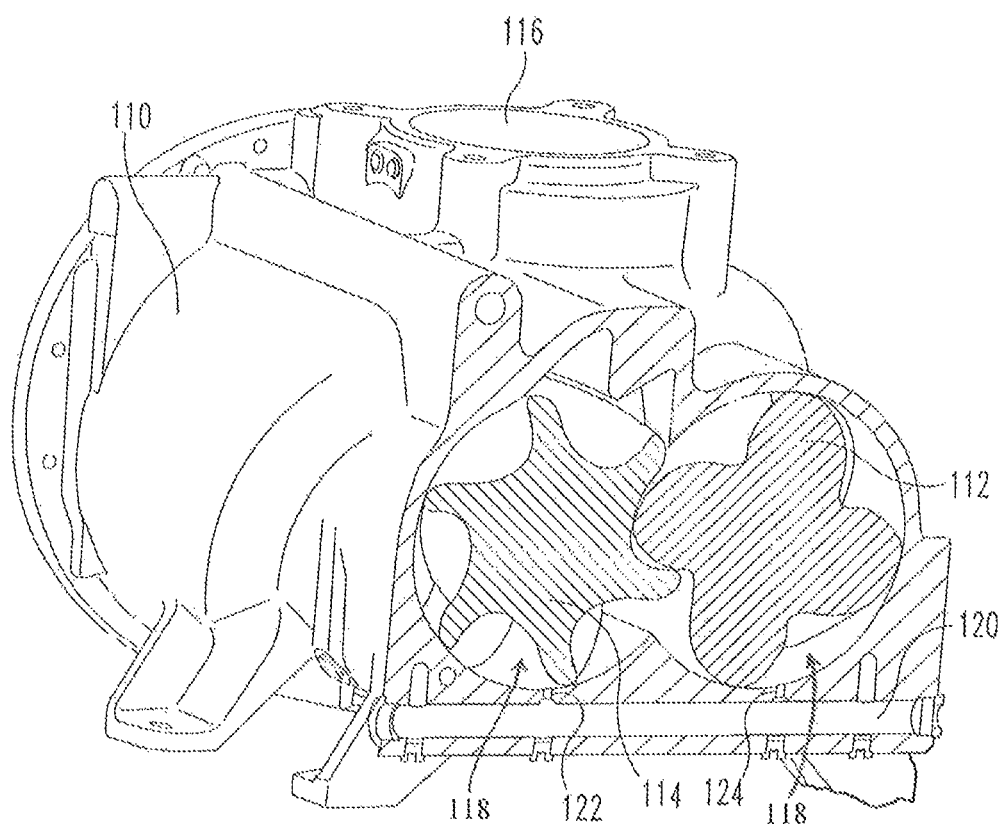
FIG. 2 is a perspective view of a compressor housing according to one embodiment of the present disclosure.

Referring now to FIG. 2, a perspective cross-sectional view of a compressor housing 110 is illustrated therein. The compressor housing 110 is configured to rotatably support the male screw rotor 112 and a meshed female screw rotor 114. An inlet 116 is formed in a wall of the compressor housing 110 to permit a compressible fluid to be drawn into a compression chamber 118 formed between the compressor housing 110 and the male and female screw rotors 112, 114, respectively. The compressor housing 110 can include one or more lubricant galleries 120 extending through a portion thereof. A plurality of lubricant ports 122,124 extend from the lubricant gallery 120 to permit ingress of lubricant into the compression chamber 118. In the exemplary embodiment, the first lubricant port 122 and the second lubricant port 124 extends from the lubricant gallery 120 to the compression chamber 118, however, in the alternate embodiments, additional lubricant ports can be fluidly connected to the lubricant gallery 120. Furthermore, in some embodiments, more than one lubricant gallery 120 can extend within different regions of the compressor housing 110.

Figure 3:
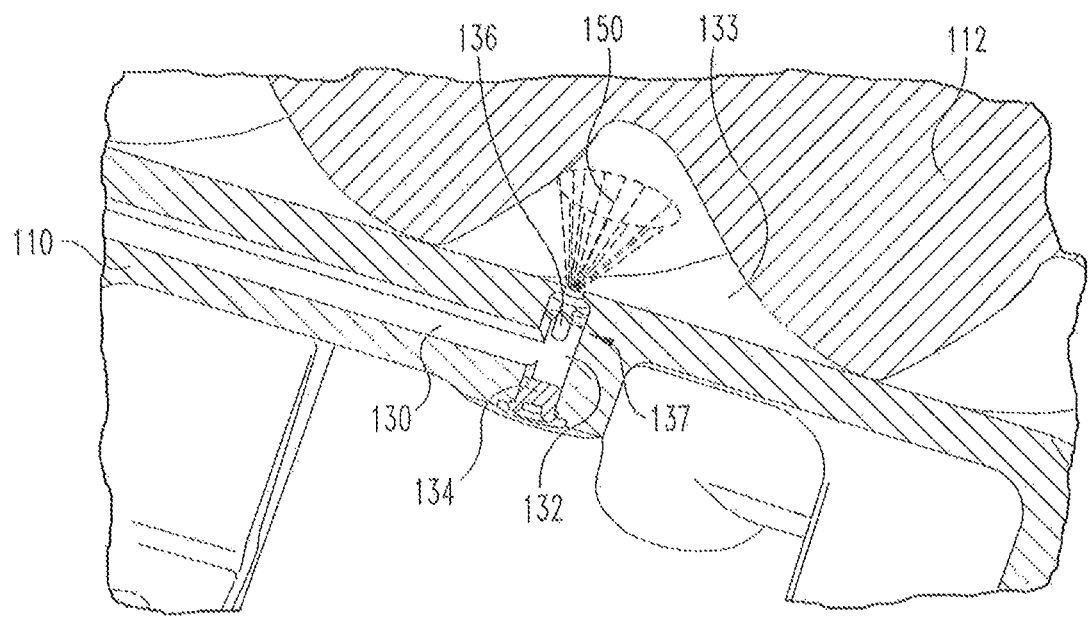
FIG. 3 is a cross-sectional view of an exemplary nozzle injector according to one embodiment of the present disclosure.
Figure 4:
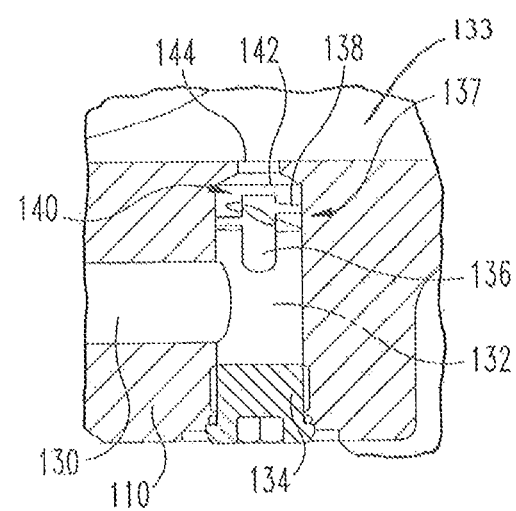
FIG. 4 is an enlarged view of the nozzle injector of FIG. 3.

Referring now to FIGS. 3 and 4, a cross-sectional view of the compressor housing 110 shows a lubricant passage 130 extending through a wall thereof. A lubricant port 132 is in fluid communication between the lubricant passage 130 and a compression region 133 within the compression chambers 118 (FIG. 2). FIG. 4 is an enlarged cross-sectional view of a portion of FIG. 3. In some forms, a plug 134 can be positioned at one end of the lubricant port 132 to provide a fluid tight seal with the housing 110. The plug 134 can be used when the lubricant port 132 is drilled, milled or otherwise formed with a tool entering externally through a wall of the housing 110. In some forms, the lubricant port 132 may be formed by drilling or otherwise removing material from an inside portion of the housing 110 thereby obviating the need for a plug 134.

In one form of the present disclosure, a nozzle insert 136 can be positioned in the lubricant port 132 at an opposite end from the plug 134 to form a portion of a nozzle injector 137. The nozzle insert 136 can include one or more blades 138 extending radially outward so as to form a swirl chamber 140 within the lubricant port 132. In one form the blades can be formed in a helical shape, however other blade shapes are contemplated by the present disclosure. The lubricant port 132 can include a converging area 142 downstream of the nozzle insert 136 to connect with a discharge orifice 144. The discharge orifice 144 is in fluid communication with to the compression region 133. In one form, the nozzle injector 137 generates an atomized conical lubricant flow pattern 150. The atomized flow is formed when the lubricant is broken up in small discreet particles. The atomized conical flow 150 enters into compression region 133 and can impinge on one or more of the male and female screw rotors 112, 114 in order to cool and to provide fluid sealing properties to the rotors 112, 114.

Figure 5:
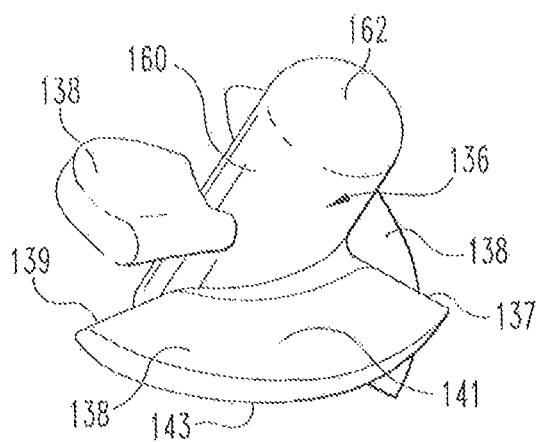
FIG. 5 is a perspective view of a nozzle insert according to one embodiment of the present disclosure.

Referring now to FIG. 5, a perspective view of one embodiment of a nozzle insert 136 is illustrated. The nozzle insert 136 can include one or more blades 138, and in the disclosed form includes three blades 138 extending from a nozzle insert post 160. In other forms, a greater number or a lesser number of blades 138 may be utilized. The nozzle insert post 160 can include a solid nose portion 162 and in some forms can be of a spherical configuration so as to reduce fluid dynamic pressure loss within the lubricant port 132. However, in other forms, the nose 162 can have other shapes. The blades 138 include a leading edge 137 extending to a trailing edge 139. The leading edge 137 is located at a relatively lower point within the lubricant port 132 and the trailing edge 139 is located at a relative higher point, i.e., closer to the compression region 133. A pair of upper and lower surfaces 143 and 141 extend between the leading edge 137 and the trailing edge 139. The blades 138 are configured to impart a rotational angular velocity or a swirl motion to the lubricant as the lubricant flows axially through the lubricant port 132. The angular velocity or swirl rate is partially defined by the velocity of the lubricant flow and the shape, size and number of blades 138 formed on the nozzle insert 136 and the axial position of the nozzle insert 136 within the port 132. The angular velocity is imparted into the flow of lubricant as the lubricant passes from the lubricant port 132 to the discharge orifice 134 and into the compression region 133. The blades 138 produce a hollow cone spray pattern. This pattern provides a finer mist, or smaller droplet size which increases heat transfer from the hot compressed working fluid. In some forms, the blades 138 can include a helical shape, in other forms the blades 138 can include various portions that are curved and/or substantially flat.

Figure 6:
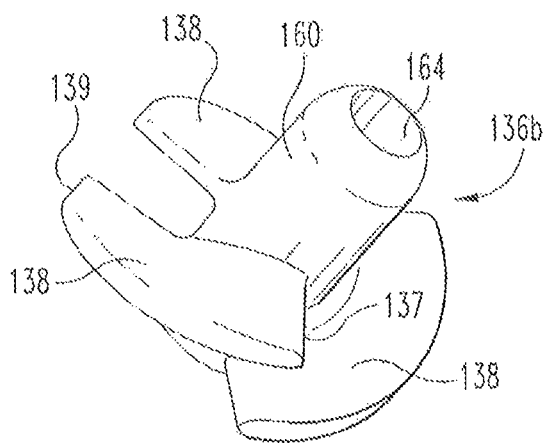
FIG. 6 is a perspective view of a nozzle insert according to another embodiment of the present disclosure.

Referring now to FIG. 6, another nozzle insert 136b is illustrated in a perspective view. The nozzle insert 136b can be substantially similar to the nozzle insert 136 shown in FIG. 5, however the body of the post 160 can include an internal flow passage 164 formed through a longitudinal length thereof. In this manner a portion of the lubricant flow can flow axially through the internal flow passage 164 of the nozzle insert 136 and another portion of the lubricant can flow externally around the post 160 and engage with the blades 138. The blades 138 operate in the same manner as the previously described embodiment of FIG. 5. However, the nozzle insert 136b will permit axial flow towards the upper portion of the lubricant port 132 while at the same time imparting a rotation or a swirl to the lubricant so as to produce a fine conical mist of atomized particles to be injected into the compression region 133. Adding an axial internal flow passage 164 in the post 160 creates a "solid" cone spray pattern filled with lubricant droplets throughout, as opposed to the hollow cone pattern as described above.

Figure 7:
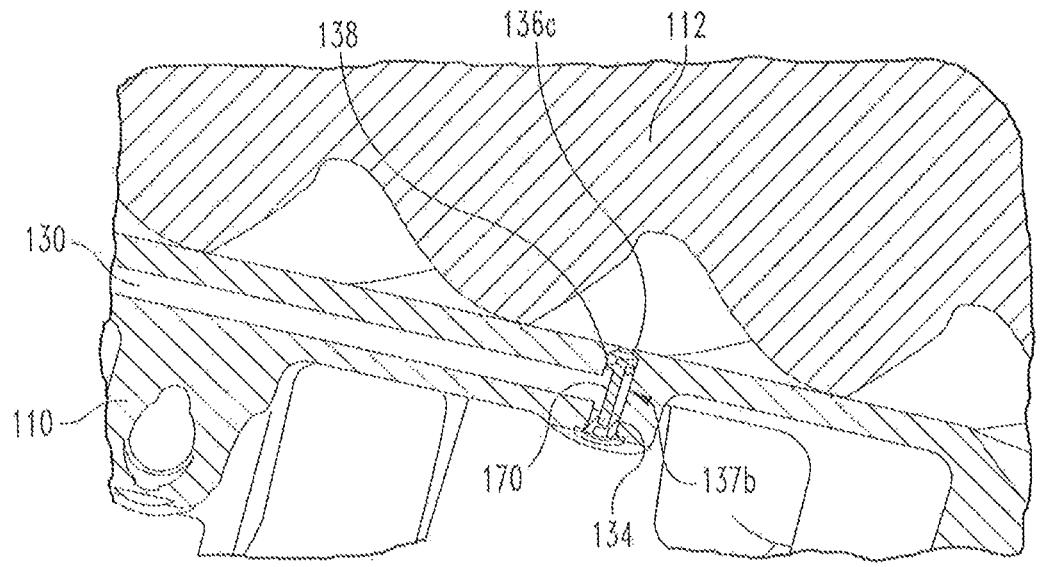
FIG. 7 is a cross-sectional view of an exemplary nozzle injector according to another embodiment of the present disclosure.
Figure 8:
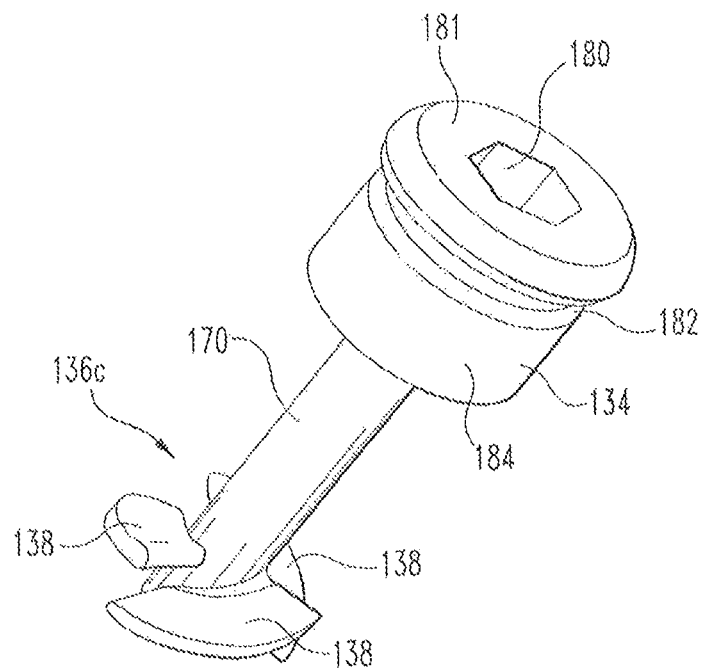
FIG. 8 is an enlarged perspective view of the nozzle insert shown in FIG. 7.

Referring now to FIG. 7, another injector nozzle 137b is shown in cross-section. The injector nozzle 137b includes a nozzle insert 136c having an elongate longitudinal body 170 that extends from the blades 138 to the plug 134. FIG. 8 shows an enlarged perspective view of the nozzle insert 136c. The nozzle insert 136c can be a one-piece unitary body wherein the plug 134 is permanently connected to the extended length longitudinal body 170. In other forms, the plug 134 can be a separate piece that is pressed or threaded onto the longitudinal body 170. The plug 134 can be similar to the plug 134 shown in the previous figures. A tool insert region 180 can be formed in a head 181 of the plug 134. In some forms, the tool insert region 180 can include a standard interface fitting for a hex drive or other common tool. In other forms, not shown, the tool insert region 180 can include protruding portions such that a socket or wrench may be used to provide a torque to install or uninstall the plug 134 to/from the lubricant port 132. The plug 134 can include a seal 182 to sealingly engage with an interface of the lubricant port 132 shown in FIGS. 3 and 4. A shank 184 extending from the head 181 may be sized to press fit into the lubricant port 132 (see FIG. 3 or 4) in some forms. In other forms the shank 184 may include threaded features in order to threadingly engage with mating threads formed in the lubricant port 132 as would be understood by one skilled in the art.

Figure 9:
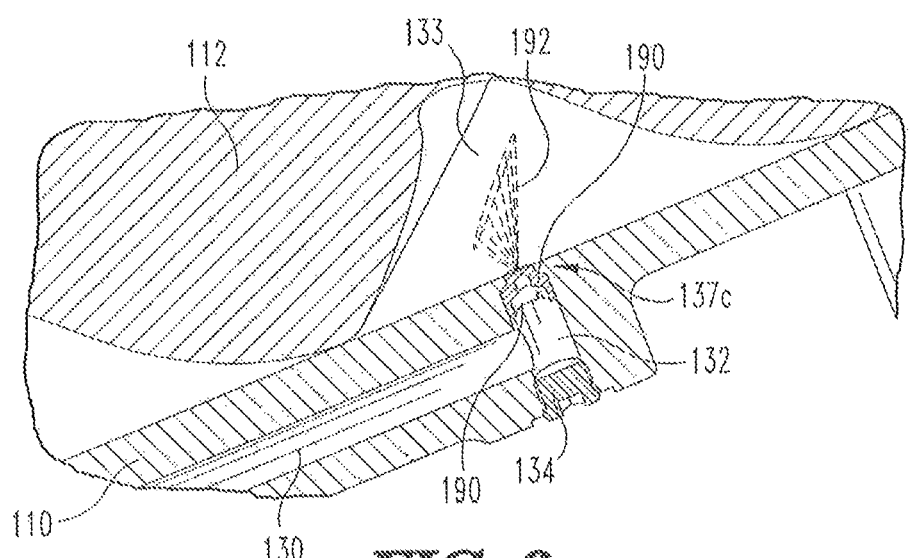
FIG. 9 is a cross-sectional view of an exemplary nozzle injector according to another embodiment of the present disclosure.

Referring now to FIG. 9, a cross-section view of a portion of the compressor housing 110 with an alternate injector nozzle 137c is shown. An alternate nozzle insert 190 may be positioned within the lubricant port 132 so as to atomize lubricant flow and generate different spray patterns such as a fan spray pattern 192, or the like. The fan spray pattern 192 can diverge outward in a substantially planer configuration to impinge upon one or more of the male or female screw rotors 112, 114 similar to the conical spray patterns described above. While the fan shaped pattern 192 may be substantially planer, there may be some lubricant particles dispersed out of plane. The lubricant flow will flow through the lubricant passage 130 and into the lubricant port 132 in similar fashion as described with other embodiments above. The plug 134 prevents the lubricant from leaking externally from the compressor housing 110. The lubricant is then directed to the alternate nozzle insert 190 to eject a fan shape spray pattern 192 into the compression region 133.

Figure 10A:
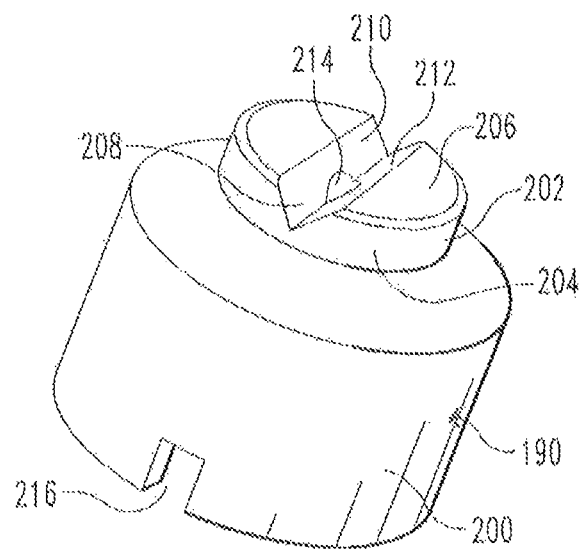
FIG. 10A is an enlarged perspective view of a nozzle insert shown in FIG. 9.
Figure 10B:
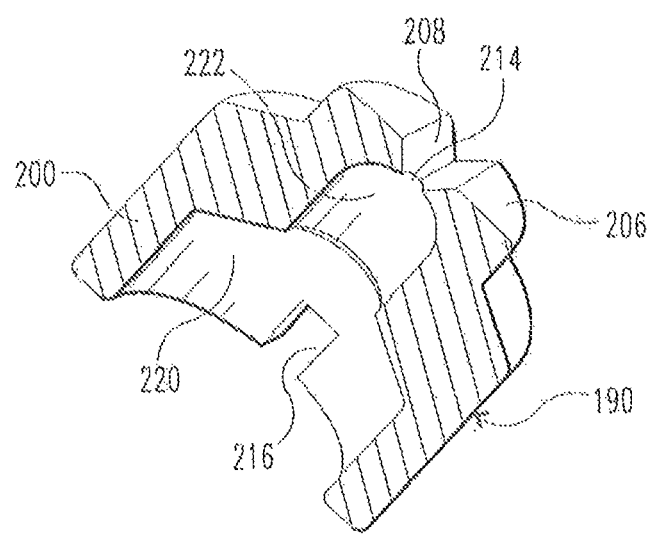
FIG. 10B is a cross-sectional cut-away view of the nozzle insert shown in FIG. 10A.

Referring to FIGS. 10A and 10B, an enlarged perspective view and a cross-sectional cut-away view of the alternate nozzle insert 190 is illustrated therein. The nozzle insert 190 can include a body 200 that is substantially configured to be in a close tolerance or a press fit arrangement with the lubricant port 132 similarly to previous nozzle inserts. Although not shown, in some forms, the nozzle insert 190 as well as the other disclosed inserts may include seals or threaded portions operable to secure and seal the nozzle insert within the lubricant port 132. A head 202 extends from the body 200 toward the compression region 133. The head 202 can include a perimeter wall 204 that has a smaller diameter than that of the body 200. The head 202 further includes a top wall 206 with a V-shaped groove 208 formed therein. The V-shaped groove 208 includes first and second diverging walls 210, 212 that extend from the body 200 to the top wall 206 of the head 202. A discharge orifice 214 is formed proximate the base of the V-shaped groove 208 of the head 202. In some forms, the discharge orifice 214 can be ovalized or "cat eyed" shaped so as to generate a dispersed fan shaped spray pattern 192 as shown in FIG. 9. The lubricant can be discharged through the discharge orifice 214 in all directions and the walls 210, 212 provide a boundary or maximum angle for the lubricant spray pattern to expand.

One or more slots 216 can be formed at one end of the body of the nozzle insert 190. The slots 216 can be used to clock or otherwise set an angle of the nozzle insert 190 so that the spray pattern shape can be positioned in a desired orientation. In this manner the orientation of the nozzle insert 190 can be optimized to maximize the efficiency of the spray pattern injected into the compression region 133 of the compression chamber 118. Referring more specifically to FIG. 10B, the nozzle insert 190 can include an internal open chamber 220 formed to provide a flow path for the lubricant to flow therein. A hemispherical dome 222 can be formed above the internal chamber 220. The size of the discharge orifice 214 can be controlled by the size and shape of the location of dome region 222 relative to the V-shaped groove 208. In some forms the dome 222 may be hemispherical, however, other forms are contemplated in the present disclosure.

Figure 11A:
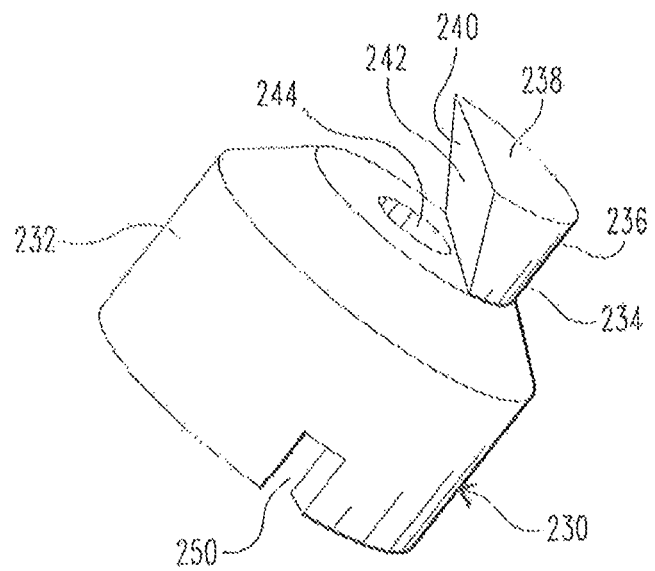
FIG. 11A is an enlarged perspective view of another nozzle insert for use in the embodiment shown in FIG. 9.
Figure 11B:
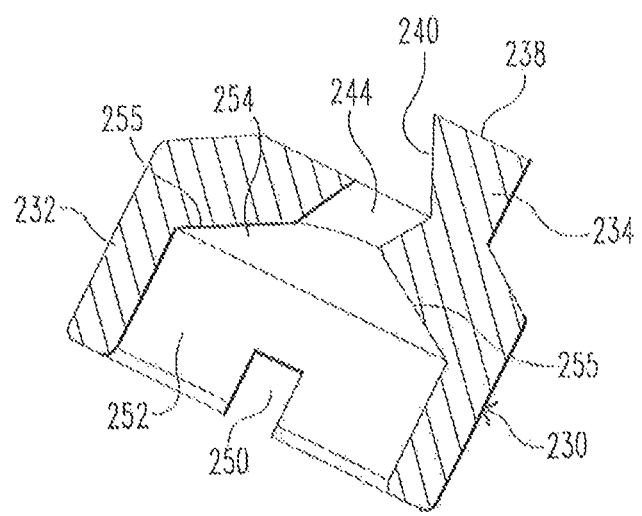
FIG. 11B is a cross-sectional cut-away view of the nozzle insert shown in FIG. 11A.

Referring now to FIGS. 11A and 11B, another nozzle 230 insert is disclosed in perspective and cross-sectional views, respectively. The nozzle insert 230 includes a body portion 232 similar to the body 200 of the nozzle insert 190 shown in FIG. 10B. A head 234 can be partially formed around the body 232 such that a perimeter wall 236 extends along a portion of the body 232. The head 234 includes a top wall 238 extending between the outer perimeter wall 236 and an angled face 240. The angled face 240 can be formed as a converging wall 242 that extends partially over a discharge orifice 244. The discharge orifice 244 can include an angled passageway directed toward the angled face 242 as illustrated in FIG. 11B. However, in other forms the discharge orifice 244 may be axially aligned with the body 232 of the insert 230. A flow of lubricant will pass through the discharge orifice 244 and at least a portion will impinge upon the angled face 240. The reflected flow can create an atomized fan shaped lubricant spray pattern. Referring more specifically to FIG. 1.1B, the nozzle insert 230 includes an internal chamber 252 for the lubricant to flow therein from the lubricant port 132. A dome region 254 with a converging flow area can be formed between the internal chamber 252 and the discharge orifice 244. The dome region 254 can include a converging side wall 255 to reduce the flow area upstream of the discharge orifice 244 to minimize pressure losses created by the smaller discharge orifice 244. The nozzle insert 230 can include one or more slots 250 formed in the body 232 to permit clocking of the nozzle insert 230 so that the angle of the spray pattern of the lubricant can be optimized for a particular compressor design.

Figure 12:
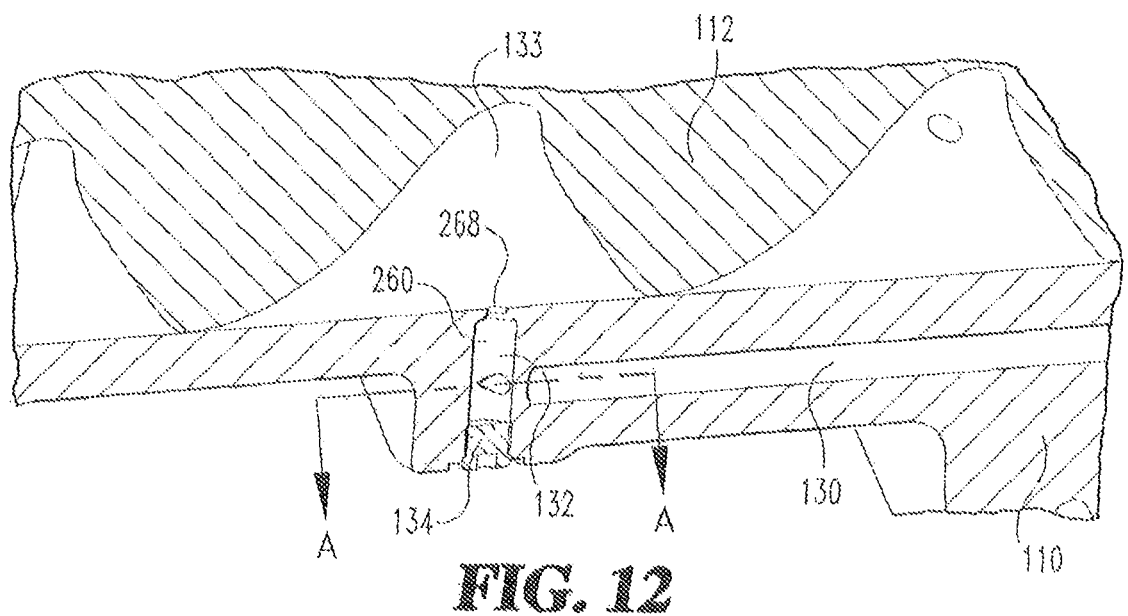
FIG. 12 is a cross-sectional view of an exemplary nozzle injector according to another embodiment of the present disclosure.

Referring now to FIG. 12, another embodiment of the present disclosure is illustrated in a cross-section view. The compressor housing 110 includes a tangential feed mechanism wherein a lubricant passage 130 is configured to induce swirl into a lubricant port 260 without a nozzle insert. A discharge orifice 268 similar to the previous embodiments is in fluid communication with the lubricant port 132. The discharge orifice 268 will inject atomized lubricant with an induced swirl hollow cone spray pattern into the compression region 133 for impingement onto one or more of the male and female rotors 112, 114. A plug 134 can be used in this embodiment similar to previously described embodiments.

Figure 13:
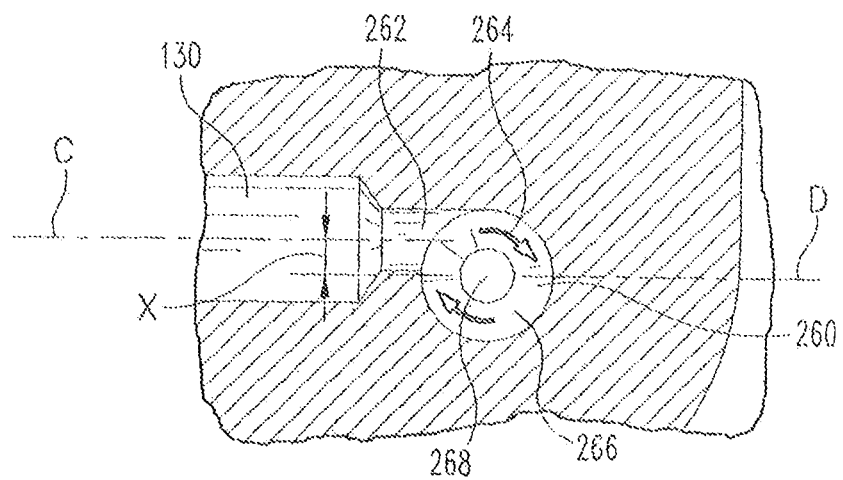
FIG. 13 is a cross-sectional view of the nozzle injector shown in FIG. 12 taken along lines A-A.

FIG. 13 is a cross-section view of FIG. 12 taken along line A-A. The lubricant passage 130 extends along a center line C which is offset from a center line D of the lubricant port 260. An offset inlet 262 extends between the lubricant passage 130 and the lubricant port 260. The offset inlet 262 imparts a tangential flow pattern into one side of the lubricant port 132 which generates a rotation flow pattern illustrated by arrows 264. The rotational flow pattern forms a swirl chamber 266 without a separate nozzle insert 136. A discharge orifice 268 will inject lubricant with an angular rotation creating a hollow cone spray pattern into a compression region 133 of the compression chamber 118. In some forms a lubricant injector may combine the tangential feed mechanism with a nozzle insert to enhance angular velocity of the lubricant flow and provide a spray pattern with finer droplet size over a wider included cone angle.

In one aspect, the present disclosure includes a compressor comprising: a compressor housing; a compression chamber positioned within the compressor housing; male and female screw rotors rotatably meshed together within the compression chamber, the screw rotors operable for compressing a working fluid; a lubricant port in fluid communication with the compression chamber; a nozzle insert having a longitudinal body extending between a first end and a second end being positioned within the lubricant port; and a swirl chamber formed by the nozzle insert within the lubricant port, the nozzle insert configured to generate an angular flow velocity within the swirl chamber and discharge atomized lubricant into the compressor chamber.

In refining aspects, the present disclosure includes a compressor system further comprising a discharge orifice formed with the lubricant port downstream of the nozzle insert, the discharge orifice having a cross-sectional flow area that is smaller than a flow area of the lubricant port; wherein the discharge orifice discharges atomized lubricant into the compression chamber; wherein the discharged atomized lubricant impinges in a dispersed pattern onto one or both of the male and female screw rotors; wherein the nozzle insert includes a blade extending outward from an outer wall of the longitudinal body; wherein the injector nozzle includes a plurality of blades extending from an outer wall of the longitudinal body, the blades spaced apart from one another along the longitudinal body; wherein the injector nozzle includes an internal flow passage extending through the longitudinal body; wherein the internal flow passage includes a variable flow area along a length thereof; further comprising a plug positioned in one end of the of the lubricant port opposite of the nozzle insert; and wherein the body extends along a length of the lubricant port to engage with the plug.

In another aspect, the present disclosure includes a screw compressor comprising: a compressor housing having a compression chamber with a pair of screw rotors rotatably supported therein; a lubricant port in fluid communication with the compression chamber; a nozzle insert having a longitudinal body extending between a first end and a second end positioned within the lubricant port; discharge orifice formed in the nozzle insert; and an angled wall extending from the nozzle insert downstream of the discharge orifice.

In refining aspects, the present disclosure includes a screw compressor wherein the discharge orifice is circular in shape; wherein the discharge orifice is angled relative to an axial flow direction through the lubricant port; wherein the nozzle insert includes a slot formed within the longitudinal body for controlling an angular orientation thereof; wherein the angled wall converges radially inward from an outer wall of the nozzle insert toward the discharge orifice; wherein a lubricant flow impinges on the angled wall downstream of the discharge orifice; and wherein a lubricant flow expands into a fan shaped pattern downstream of the orifice.

In another aspect, the present disclosure includes a method for injecting lubricant into a compression chamber of a screw compressor, the method comprising: flowing a lubricant through a passageway; atomizing the lubricant with a nozzle insert positioned in the passageway; injecting the atomized lubricant into the compression chamber; impinging a dispersed atomized flow of lubricant onto a screw rotor; and dispersing the atomized flow throughout a compressed working fluid within the compression chamber.

In refining aspects, the present disclosure includes a method further comprising imparting a swirl to the flow of lubricant with a nozzle insert having at least one blade extending radially outward from a body of the nozzle insert; and discharging a fan shaped or a conic shaped flow pattern of lubricant from a discharge orifice formed in the nozzle insert.

In another aspect, the present disclosure includes a compressor comprising: a compressor housing; a compression chamber positioned within the compressor housing; male and female screw rotors rotatably meshed together within the compression chamber, the screw rotors operable for compressing a working fluid; a lubricant passageway having a centerline flow axis extending through a wall of the compressor housing; a lubricant port in fluid communication with the lubricant passageway and the compression chamber, wherein a centerline axis of the lubricant port is offset from the centerline axis of the lubricant passageway; and a swirl chamber formed by a tangential flow of lubricant into the offset lubricant port, the swirl chamber configured to generate an angular lubricant flow velocity and discharge an atomized lubricant flow into the compression chamber.

In refining aspects, the present disclosure includes a compressor further comprising a nozzle insert positioned within the lubricant port.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

What is claimed is:

1. A method for injecting lubricant into a compression chamber of a screw compressor, the method comprising:
    flowing a lubricant through a passageway which includes a lubricant port;
    atomizing the lubricant with a nozzle insert positioned in the lubricant port;
    imparting a swirl to the flow of lubricant with the nozzle insert having at least one blade extending radially outward from a body of the nozzle insert;
    injecting the atomized lubricant into the compression chamber via the lubricant port in which a plug is positioned at one end of the lubricant port opposite of the nozzle insert configured to provide a fluid seal with a compressor housing;
    impinging a dispersed atomized flow of the lubricant onto a screw rotor; and
    dispersing the atomized flow of the lubricant throughout a compressed working fluid within the compression chamber.

2. The method of claim 1 further comprising: discharging a fan shaped or a conic shaped flow pattern of the lubricant from a discharge orifice formed in the nozzle insert.

3. A compressor comprising:
    a compressor housing;
    a compression chamber positioned within the compressor housing;
    male and female screw rotors rotatably meshed together within the compression chamber, the screw rotors operable for compressing a working fluid;
    a lubricant port in fluid communication with the compression chamber;
    a nozzle insert having a longitudinal body extending between a first end and a second end being positioned within the lubricant port;
    a swirl chamber formed by the nozzle insert within the lubricant port, the nozzle insert configured to generate an angular flow velocity within the swirl chamber and discharge atomized lubricant into the compressor chamber; and
    a plug positioned in one end of the lubricant port opposite of the nozzle insert configured to provide a fluid seal with the compressor housing.

4. The compressor system of claim 3 further comprising a discharge orifice formed with the lubricant port downstream of the nozzle insert, the discharge orifice having a cross-sectional flow area that is smaller than a flow area of the lubricant port.

5. The compressor system of claim 4, wherein the discharge orifice discharges the atomized lubricant into the compression chamber.

6. The compressor system of claim 5, wherein the discharged atomized lubricant impinges in a dispersed pattern onto one or both of the male and female screw rotors.

7. The compressor system of claim 3, wherein the nozzle insert includes a blade extending outward from an outer wall of the longitudinal body.

8. The compressor system of claim 3, wherein the injector nozzle includes a plurality of blades extending from an outer wall of the longitudinal body, the blades spaced apart from one another along the longitudinal body.

9. The compressor system of claim 3, wherein the injector nozzle includes an internal flow passage extending through the longitudinal body.

10. The compressor system of claim 9, wherein the internal flow passage includes a variable flow area along a length thereof.

11. The compressor system of claim 3, wherein the body extends along a length of the lubricant port to engage with the plug.

* * * * *

UNITED STATES PATENT AND TRADEMARK OFFICE
CERTIFICATE OF CORRECTION

PATENT NO. : 10,851,786 B2  
APPLICATION NO. : 15/717596  
DATED : December 1, 2020  
INVENTOR(S) : Crum et al.

Page 1 of 1

It is certified that error appears in the above-identified patent and that said Letters Patent is hereby corrected as shown below:

In the Specification

Column 6, Line 58:
". . . specifically to FIG. 1.1B, the nozzle insert 230. . ."
Should read:
-- specifically to FIG. 11B, the nozzle insert 230 --

Signed and Sealed this
Sixteenth Day of November, 2021

Drew Hirshfeld
*Performing the Functions and Duties of the*
*Under Secretary of Commerce for Intellectual Property and*
*Director of the United States Patent and Trademark Office*